United States Patent
Itoh (10) Patent No.: US 7,474,628 B2
(45) Date of Patent: Jan. 6, 2009

(54) CHANNEL QUALITY ESTIMATION METHOD AND CHANNEL QUALITY ESTIMATION APPARATUS

(75) Inventor: Katsutoshi Itoh, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 615 days.

(21) Appl. No.: 11/092,901

(22) Filed: Mar. 30, 2005

(65) Prior Publication Data

US 2005/0220056 A1 Oct. 6, 2005

(30) Foreign Application Priority Data

Apr. 5, 2004 (JP) ............... 2004-110876

(51) Int. Cl.
*G06F 11/00* (2006.01)
(52) U.S. Cl. ...................................... 370/252
(58) Field of Classification Search .......... 370/335, 370/342, 252, 325, 329; 375/130–215
See application file for complete search history.

(56) References Cited

U.S. PATENT DOCUMENTS

| | | | | |
|---|---|---|---|---|
| 5,450,453 A | * | 9/1995 | Frank ........................ | 375/130 |
| 5,909,384 A | * | 6/1999 | Tal et al. ..................... | 708/322 |
| 6,292,519 B1 | * | 9/2001 | Popovic ..................... | 375/346 |
| 6,363,128 B1 | * | 3/2002 | Isaksson et al. ............. | 375/355 |
| 6,470,044 B1 | * | 10/2002 | Kowalski .................... | 375/148 |
| 6,738,624 B1 | * | 5/2004 | Aksentijevic et al. .... | 455/452.1 |
| 2002/0172261 A1 | * | 11/2002 | Hershey et al. ............. | 375/130 |
| 2003/0003889 A1 | | 1/2003 | Perets | |
| 2003/0198283 A1 | * | 10/2003 | Patel et al. .................. | 375/147 |
| 2004/0076185 A1 | * | 4/2004 | Kim et al. ................... | 370/488 |
| 2004/0184398 A1 | * | 9/2004 | Walton et al. ............... | 370/203 |
| 2004/0203397 A1 | * | 10/2004 | Yoon et al. ................. | 455/63.1 |
| 2004/0264604 A1 | * | 12/2004 | Malette et al. .............. | 375/340 |
| 2005/0243774 A1 | * | 11/2005 | Choi et al. .................. | 370/335 |
| 2006/0187877 A1 | * | 8/2006 | Lundby et al. .............. | 370/328 |
| 2007/0213087 A1 | * | 9/2007 | Laroia et al. ................ | 455/522 |

FOREIGN PATENT DOCUMENTS

| | | |
|---|---|---|
| EP | 1 221 777 A1 | 7/2002 |
| EP | 1 453 263 A1 | 9/2004 |
| WO | WO 03/049392 A1 | 6/2003 |

* cited by examiner

*Primary Examiner*—Kwang B. Yao
*Assistant Examiner*—Kenan Cehic
(74) *Attorney, Agent, or Firm*—Oblon, Spivak, McClelland, Maier & Neustadt, P.C.

(57) ABSTRACT

A channel quality estimation method for estimating a channel quality of an estimation object channel based on a pilot signal in a communication system where a pilot channel for transmitting the pilot signal and the estimation object channel, whose channel quality is to be estimated, have different bandwidths.

7 Claims, 7 Drawing Sheets

RELATED ART

FIG. 9

RELATED ART

FIG.11

CHANNEL QUALITY ESTIMATION METHOD AND CHANNEL QUALITY ESTIMATION APPARATUS

BACKGROUND OF THE INVENTION

This invention relates to a radio communication system which uses an adaptive modulation and coding method to achieve high-speed data transmission.

An adaptive modulation and coding rate communication method for a communication system is generally known wherein the coding rate and the multi-value modulation factor of error correction codes are varied in response to the propagation path quality such that, to a user to whom the propagation quality is high, high-speed data communication is provided while the noise resisting property is sacrificed, but to another user to whom the propagation quality is low, low-speed data communication is provided attaching importance to the noise resisting property. One of such adaptive modulation and coding rate communication methods is disclosed, for example, in Japanese Patent Laid-Open No. 2003-174485.

In recent years, a communication method which uses such adaptive modulation as described above has been adapted also to a radio communication system which involves mobile radio communication for a portable telephone system and so forth. One of such radio communication systems is the HDR (High Data Rate). Also the W-CDMA (Wide-band Code Division Multiple Access) additionally adopts a similar method (HSDPA: High Speed Downlink Packet Access).

The communication method described achieves communication which adopts the adaptive modulation-coding rate in accordance with the following basic procedure.

1. A terminal measures a channel quality of a signal transmitted thereto from a base station.
2. The terminal notifies the base station of a modulation method and coding rate (hereinafter referred to as mode requesting message) estimated to be optimum from a result of the channel quality measurement.
3. The base station determines a modulation system-coding rate (hereinafter referred to generally as transmission mode) to be allocated actually from the mode requesting message received from the terminal and a state of resources of the base state and transmits a parameter (transmission parameter) of the determined transmission mode to the terminal.
4. The base state transmits user data based on the determined transmission parameter.
5. The terminal receives the transmission parameter and performs a data reception process based on the transmission parameter.
6. If an error is detected in the received data, then the terminal returns a re-sending request, but if the data is received accurately, then the terminal transmits a new data transmission request to the base station.
7. The steps 1 to 6 above are repeated cyclically.

Figure 4:
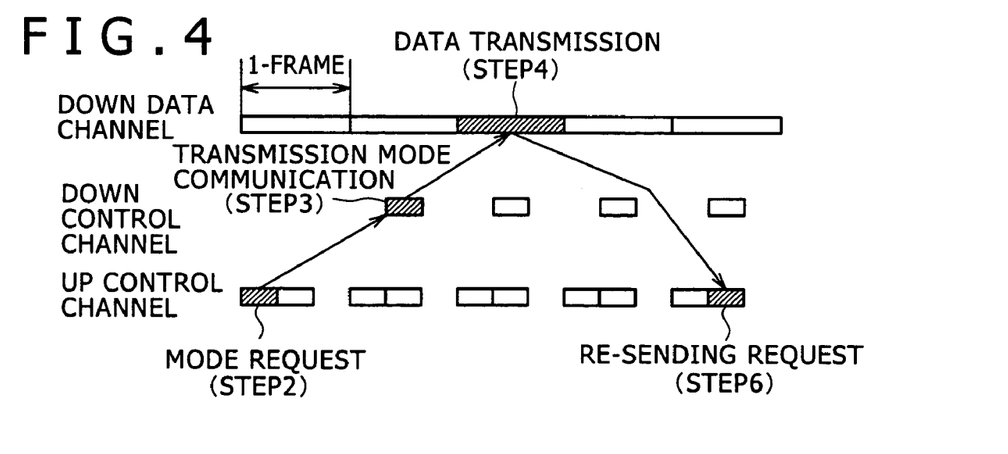
FIG. 4 is a diagrammatic view illustrating a processing procedure of a system to which the present invention is applied.

The processing procedure described above is illustrated in FIG. 4. FIG. 4 particularly illustrates a relationship among a down control channel for notifying the terminal of the transmission parameter of the down data transmission from the base station, a down data channel for transmitting user data from the base station and a control channel for transmitting the transmission parameter request from the terminal. FIG. 4 illustrates an example wherein the steps 1 to 6 described above are repeated in a frame cycle.

When the base station performs transmission of down data, it varies the data transmission rate in accordance with a reception situation (channel quality) of the user terminal so that it transmits data with a higher efficiency to the user terminal side. Further, the base station attaches importance to the efficiency of the system and allocates a predetermined data transmission radio source to a user terminal which has a channel quality relatively higher than a long term average channel quality.

Figure 5:
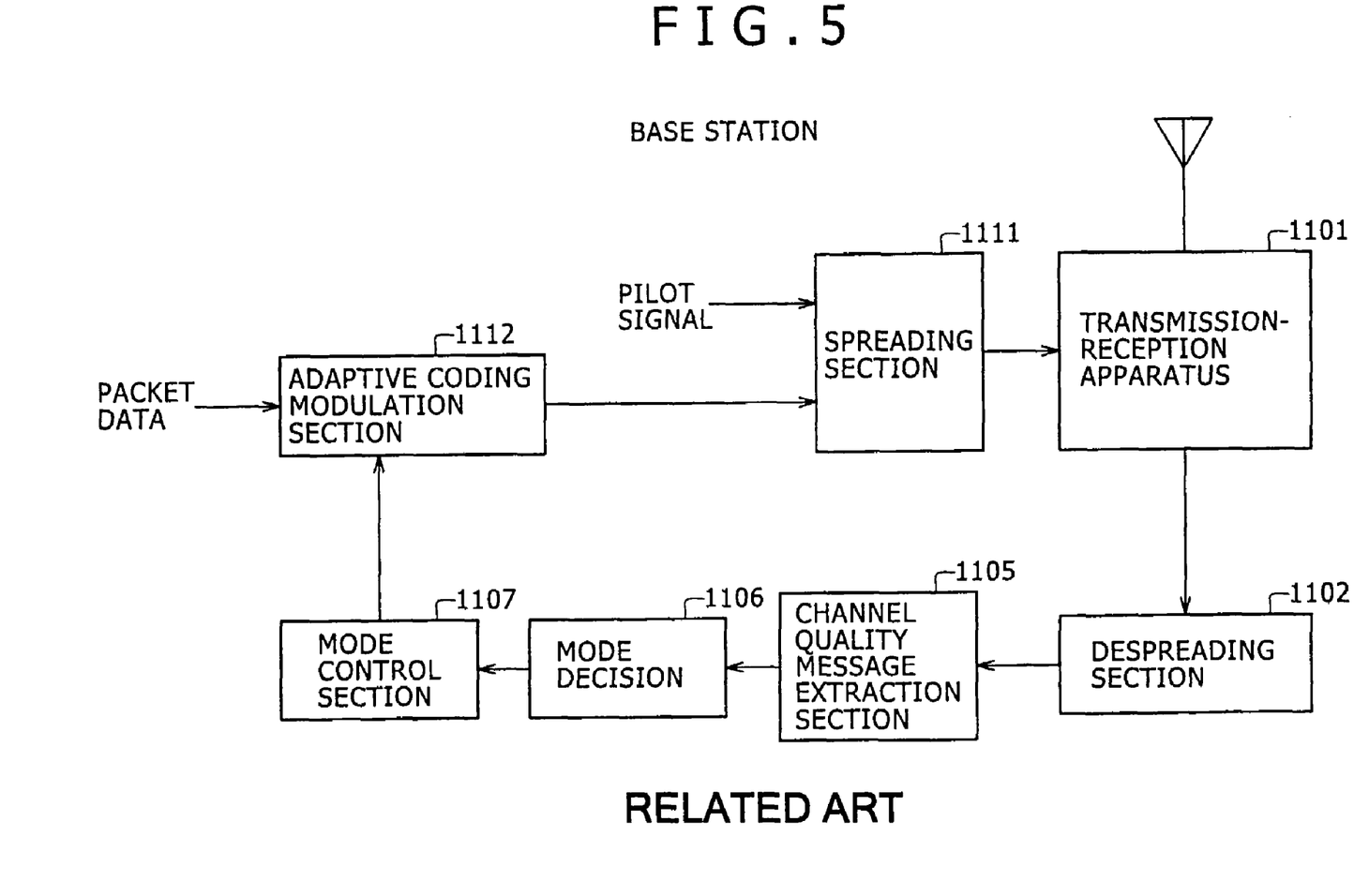
FIG. 5 is a block diagram showing an example of a configuration of a conventional base station which is used to implement a communication method used in the present invention.

FIG. 5 shows an example of a configuration of a conventional base station which implements the communication method described above. Referring to FIG. 5, the base station includes a transmission/reception apparatus 1101, a despreading section 1102, a channel quality message extraction section 1105, a mode decision section 1106, a mode control section 1107, a spreading section 1111, and an adaptive coding modulation section 1112.

The base station demodulates a transmission signal from a user by means of the transmission/reception apparatus 1101 and the despreading section 1102. The base state acquires a channel quality value transmitted thereto from a terminal from the demodulated data by means of the channel quality message extraction section 1105. The mode decision section 1106 selects an optimum transmission mode (modulation and coding methods) from the extracted channel quality. The mode control section 1107 performs setting of the adaptive coding modulation section 1112 in accordance with the transmission mode decided by the mode decision section 1106 to control the user data channel. The modulated and coded user data and a pilot signal to be used for synchronization are spread by the spreading section 1111. At this time, the spreading factor of the user data and the pilot signal spreading factor do not necessarily coincide with each other, and they have a relationship of the user data spreading factor SFd<=pilot signal spreading factor SFp. The spread combined signal is transmitted as a radio signal through the transmission/reception apparatus 1101.

Figure 6:
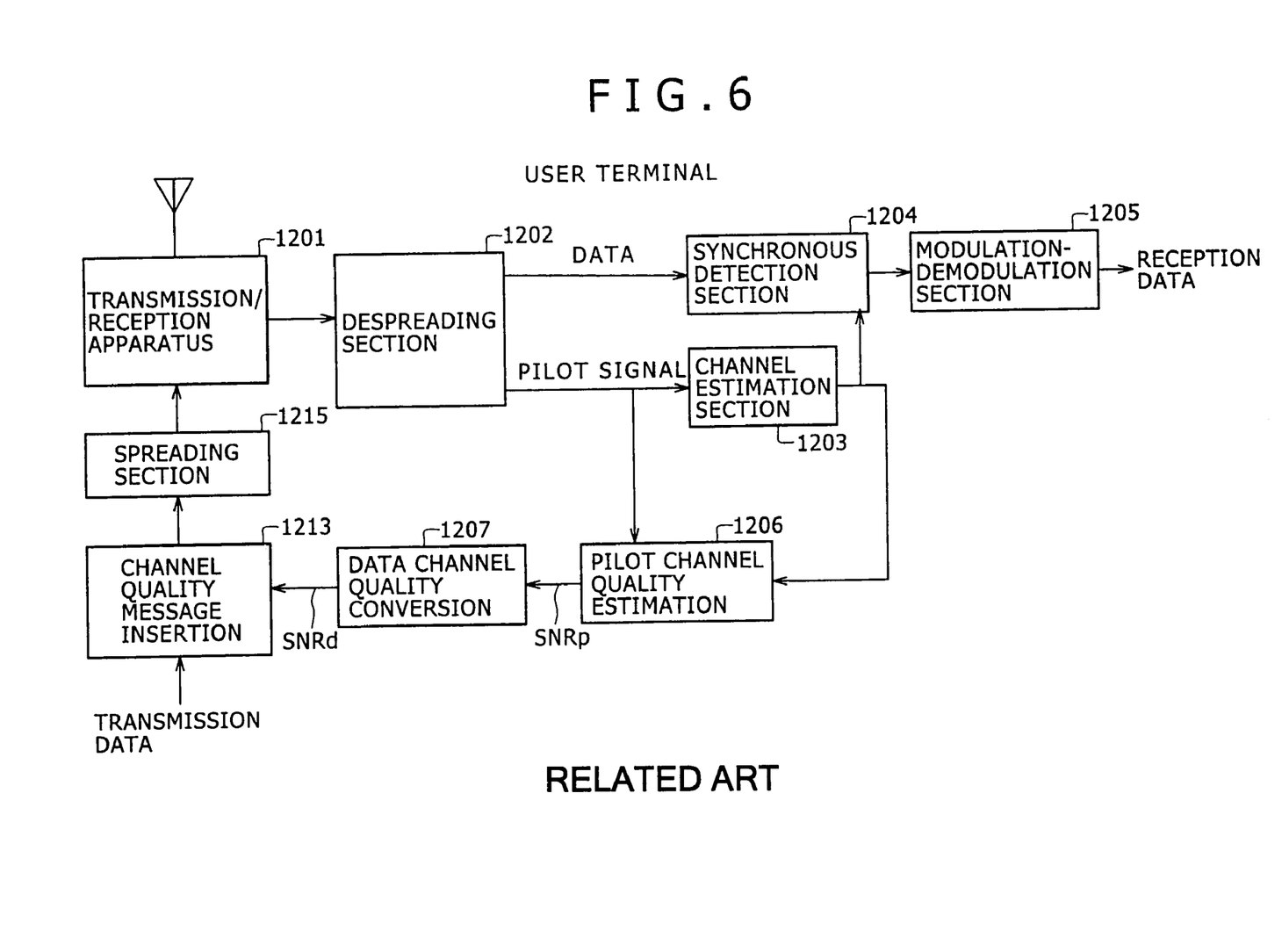
FIG. 6 is a block diagram showing an example of a configuration of a conventional user terminal.

FIG. 6 shows an example of a configuration of a conventional user terminal which implements the communication method described above.

Referring to FIG. 6, the user terminal includes a transmission/reception apparatus 1201, a despreading section 1202, a channel estimation section 1203, a synchronous detection section 1204, a demodulation-decoding section 1205, a pilot channel quality estimation section 1206, a data channel quality conversion section 1207, a channel quality message insertion section 1213 and a spreading section 1215.

A transmission signal signaled from the base station is received through the transmission/reception apparatus 1201 and separated into data of a data channel and pilot channel data by a despreading process by the despreading section 1202. The demultiplexed pilot signal is inputted to the channel estimation section 1203, by which multi-path fading environments are estimated. The channel estimation value as the multi-path fading environments can be derived in accordance with, for example, the following expression (1) utilizing known data (pilot signal):

$$\hat{h} = \sum_i r_P[i] \tag{1}$$

where $r_p$ is the despread pilot signal, and the hat mark of the variable h on the left side represents that the variable h is an estimated value.

The demultiplexed data signal is subject to compensation for a phase variation given thereto by the radio propagation path by multiplying the reception data (despread data) rd by a complex conjugate of the channel estimation value determined in accordance with the expression (1) as in the following expression (2) by means of the synchronous detection section 1204:

$$d = \hat{h}^* \times r_d \qquad (2)$$

where $r_d$ is the despread data.

The data d outputted from the synchronous detection section 1204 undergoes a demodulation process and an error correction process by the demodulation-decoding section 1205 to form reception data.

The pilot channel quality estimation section 1206 determines a signal S of the pilot channel in accordance with expressions (3) and (4) given below, determines noise of the signal S in accordance with an expression (5) given below and calculates a signal to noise ratio (SNR) of the pilot channel in accordance with an expression (6) given below:

$$s = \frac{1}{M} \sum_i \left( \hat{h}^* \times r_p[i] \right) \qquad (3)$$

$$S = |s|^2 \qquad (4)$$

$$N = \frac{1}{M-1} \sum_i |r_p[i] - s|^2 \qquad (5)$$

$$SNR_p = 10 \log \frac{S}{N} \text{ [dB]} \qquad (6)$$

where $r_p$ is the despread pilot signal, and M is the average length (in the present example, the pilot symbol number in one slot is 10).

The data channel quality conversion 1207 converts the pilot channel quality into a data channel quality. This conversion corrects the difference between the spreading factors and is performed in accordance with the following expression (7):

$$SNR_d = SNR_p + 10 \log \left( \frac{SF_d}{SF_p} \right) \qquad (7)$$

where $SF_p$ is the spreading factor for the pilot signal, and $SF_d$ is the spreading factor for the data channel.

Figure 7:
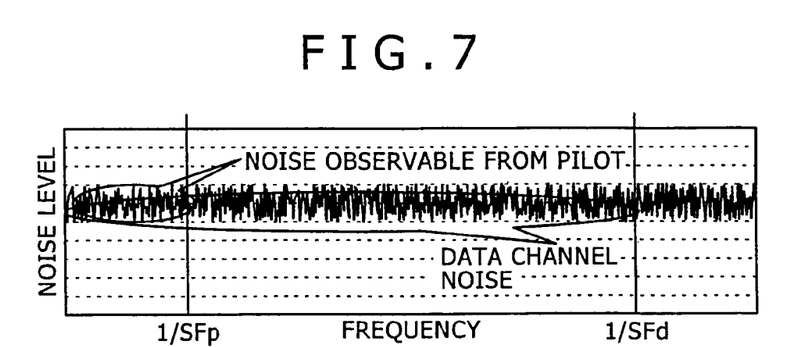
FIG. 7 is a graph illustrating a noise level with respect to the frequency observed from a signal of a pilot channel.

The second term on the right side of the expression (7) usually has a negative value because the user data spreading factor SFd is usually lower than the pilot signal spreading factor SFp as described hereinabove. In other words, the expression (7) functions such that a value obtained by decreasing the channel quality estimation value of the pilot channel in response to the ratio between the two spreading factors is used as an estimation value of the channel quality of the data channel. It can be considered that this compensates for noise of a high frequency portion removed by the despreading as seen from FIG. 7. In other words, the despreading can be regarded as a filter function, and it is considered that, as the spreading factor increases, the bandwidth of the filter decreases. Accordingly, the noise component obtained by decreasing the reception signal of the data channel having a lower spreading factor is greater than the noise component obtained by despreading the reception signal of the pilot channel having a higher spreading factor.

The channel quality message insertion section 1213 inserts the data channel quality value obtained in accordance with the expression (7) into the transmission data.

The spreading section 1215 spreads the transmission data and the channel quality value and transmits the resulting data as a radio signal to the base station through the transmission/reception apparatus 1201.

The user terminal having the configuration described above allows selection of a modulation and coding method in accordance with the channel quality of the terminal on the base station side. Thus, the data transmission rate can be varied in accordance with a reception situation of a user terminal to achieve efficient data transmission.

In this manner, the base station determines the data transmission rate in order to transmit data in accordance with a channel quality of the user terminal. Therefore, in order to use the system efficiently, the accuracy of the channel quality value estimated by the terminal side is significant.

On the other hand, the spreading factor conversion applied by the expression (7) is based on the assumption that the noise is white. As seen from the following expressions (8) and (9), a reception signal rx includes a desired signal s, noise nch generated in a radio section and noise no generated in the inside of the receiver, and the assumption of the expression (7) is valid in a situation wherein internal noise of the receiver can be ignored.

$$rx = s + n\text{ch} + n\text{o} \qquad (8)$$

$$n\text{o} = n\text{white} + n\text{color} \qquad (9)$$

Figure 8:
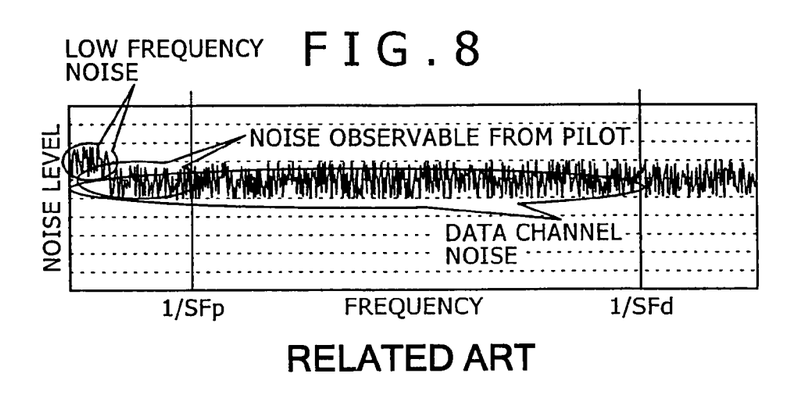
FIG. 8 is a graph illustrating a noise level with respect to the frequency and illustrating a problem of a conventional communication method.
Figure 9:
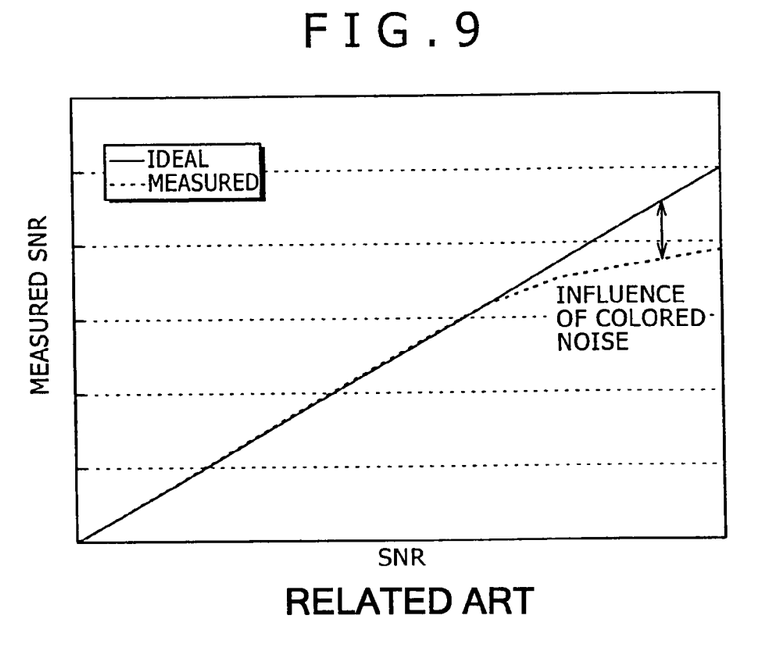
FIG. 9 is a graph illustrating an error of a measured SNR and illustrating a problem of the conventional communication method.

However, as seen in FIG. 9, under a situation wherein the SNR is extremely good, that is, under a situation wherein very high quality data transmission is possible, a state wherein the noise no cannot be ignored is established, and there is the necessity to take noise factors ncolor (colored noise) other than white noise which composes receiver noise into consideration. The noise factors ncolor are generated from a PLL (Phase Locked Loop) and an AFC (Automatic Frequency Control) which compose a radio unit, and generally, low frequency noise belonging to a low frequency region from within noise which can be observed from a pilot signal as seen from FIG. 8. Therefore, if noise estimated from a pilot signal (low-pass filtered signal) having a high spreading factor is converted into data channel noise in accordance with the expression (7), then it is estimated that also the high frequency region includes similar noise to that in the low frequency region. This causes the amount of the noise in the high frequency region to be estimated to be more than the actual noise amount, resulting in failure of enjoyment by a user of a service of a high data rate which the user can originally enjoy.

SUMMARY OF THE INVENTION

It is an object of the present invention to provide a channel quality estimation method and apparatus by which, in a communication method wherein a pilot channel which transmits a pilot signal whose channel quality is to be referred to and an estimation object channel whose channel quality is to be estimated have different bandwidths (spreading factors), the channel quality of the estimation object channel can be estimated with a high degree of accuracy based on the pilot signal.

In order to attain the object described above, according to an aspect of the present invention, there is provided a channel quality estimation method for estimating, in a communication method wherein a pilot channel for transmitting a pilot signal whose channel quality is to be referred to and an estimation object channel whose channel quality is to be estimated have different bandwidths from each other, the channel quality of the estimation object channel based on the pilot signal, having the steps of extracting a noise component of the pilot signal, extracting different frequency components which form noise, expanding the band of the noise component of the pilot signal in response to the degree of difference of the band, adjusting the noise amount obtained by the band expansion based on the different frequency components, and determining the channel quality of the estimation object channel based on the noise amount obtained by the band expansion.

In the channel quality estimation method, not a noise component extracted from the pilot signal is merely expanded in band to estimate the amount of noise of the estimation object channel, but different frequency components which form the noise of the pilot signal are extracted and a noise amount obtained by band expansion is adjusted based on the extracted different frequency components. In particular, receiver internal noise whose influence appears, for example, when the channel quality is high is recognized through the extraction of different frequency components, and the reception channel quality of the estimation object channel is estimated with a higher degree of accuracy based on the recognized receiver inner noise. It is to be noted that "the degree of difference of the band" is, in the preferred embodiment of the present invention hereinafter described, a ratio of the spreading factor.

The step of extracting different frequency components which form the noise may include determining a low frequency component as one of the different frequency components which form the noise, and estimating the difference in noise component which depends upon the frequency region from the determined low frequency component and the extracted noise component, the step of adjusting the noise amount whose band is to be expanded adjusting the noise amount whose band is to be expanded based on the difference in noise component which depends upon the frequency region.

The reception quality estimation method may further include the steps of determining the channel quality of the pilot channel, and weighting the difference in noise component in response to the determined channel quality of the pilot channel.

According to another aspect of the present invention, there is provided a channel quality estimation apparatus for estimating, in a communication method wherein a pilot channel for transmitting a pilot signal whose channel quality is to be referred to and an estimation object channel whose channel quality is to be estimated have different bandwidths from each other, the channel quality of the estimation object channel based on the pilot signal, including a despreading section, a channel estimation section, a pilot channel quality estimation section, a low frequency noise component estimation section, and a data channel quality conversion section. The despreading section performs a despreading process to separate data of the estimation object channel and the pilot signal of the pilot channel from each other. The channel estimation section determines a channel estimation value based on the separated pilot signal. The pilot channel quality estimation section produces a signal level and a noise level of the pilot channel based on the channel estimation value determined by the channel estimation section and the pilot signal. The low frequency noise component estimation section produces a low frequency component of the noise of the pilot signal. The data channel quality conversion section determines the channel quality of the data channel based on the outputs of the pilot channel quality estimation section and the low frequency noise component estimation section.

In the channel quality estimation apparatus, the difference in noise component which depends upon the frequency region is taken into consideration to recognize receiver internal noise which cannot be assumed to be white in the reception pilot signal, and the channel quality of the estimation object channel can be estimated with a high degree of accuracy based on the recognized receiver internal noise. As a result, in applications wherein the channel quality of the data channel is estimated, estimation of the channel quality with a higher degree of accuracy can be anticipated also under high SNR environments, and an adaptive modulation and coding method can be used efficiently.

Further, if the difference in noise component is weighted in response to the channel quality of the pilot channel, then a malfunction by an estimated dispersion when the channel quality is low can be suppressed.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, a preferred embodiment of the present invention is described.

Figure 1:
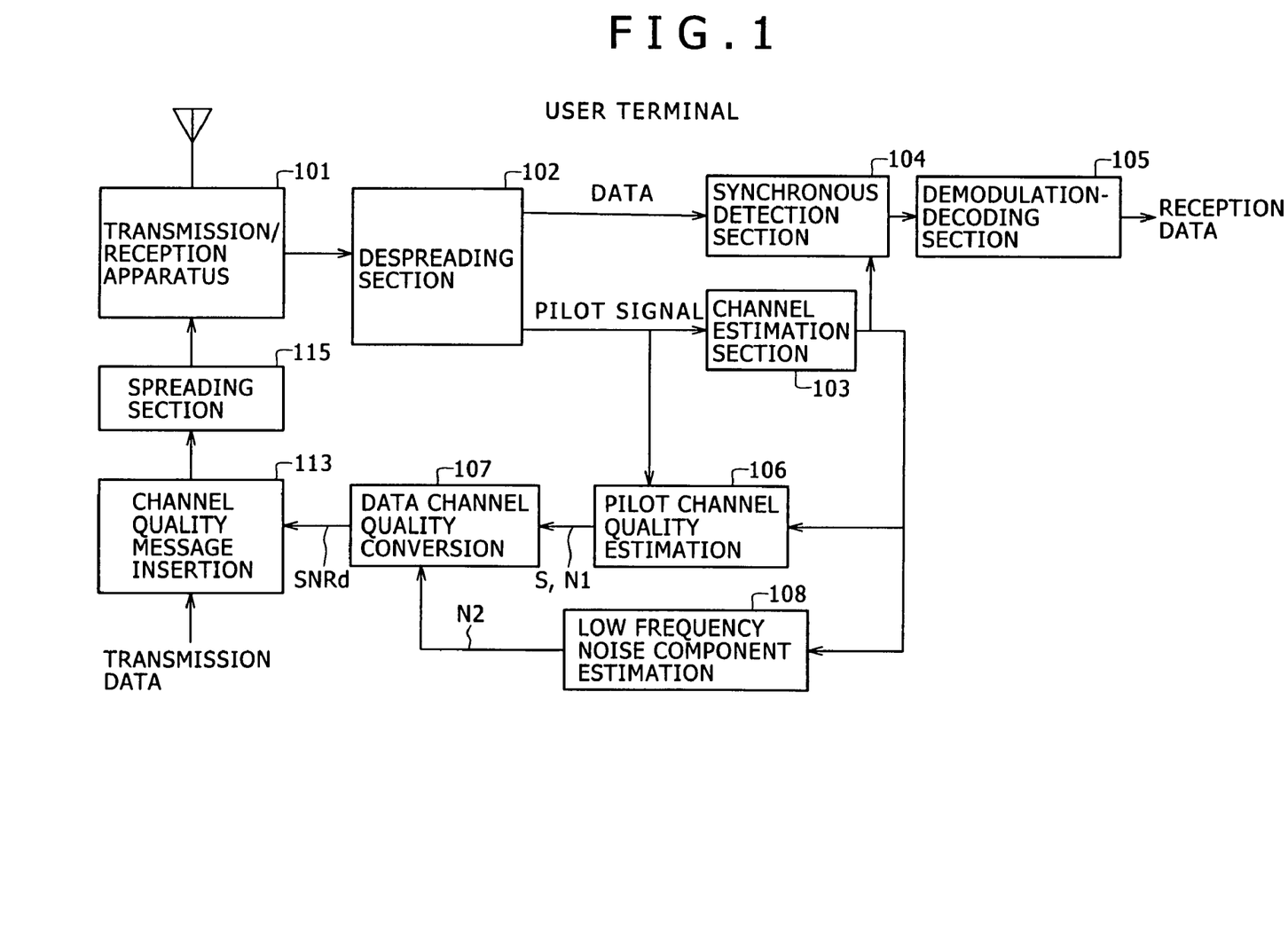
FIG. 1 is a block diagram showing an example of a configuration of a user terminal in a preferred embodiment of the present invention.

Referring to FIG. 1, there is shown an example of a configuration of a user terminal used in a radio communication system which uses an adaptive modulation and coding method to implement high-speed data transmission according to the preferred embodiment of the present invention. It is to be noted that a base station used in the radio communication system has such a configuration as described hereinabove with reference to FIG. 5, and overlapping description thereof is omitted herein to avoid redundancy.

The user terminal shown in FIG. 1 includes a transmission/reception apparatus 101, a despreading section 102, a channel estimation section 103, a synchronous detection section 104, a demodulation-decoding section 105, a pilot channel quality estimation section 106, a data channel quality conversion section 107, a channel quality message insertion section 113, a spreading section 115, and a low frequency noise component estimation section 108 in addition to the components mentioned. The other part of the user terminal than the pilot channel quality estimation section 106, data channel quality conversion section 107 and low frequency noise component estimation section 108 is similar in configuration and function to the other part of the conventional user terminal described hereinabove with reference to FIG. 6 than the pilot channel quality estimation 1206 and the data channel quality conversion 1207. Therefore, overlapping description of the common components is omitted herein to avoid redundancy.

In the present embodiment, different frequency noise components in a pilot signal are determined separately to correct a difference in noise component between the different frequency bands.

Figure 10:
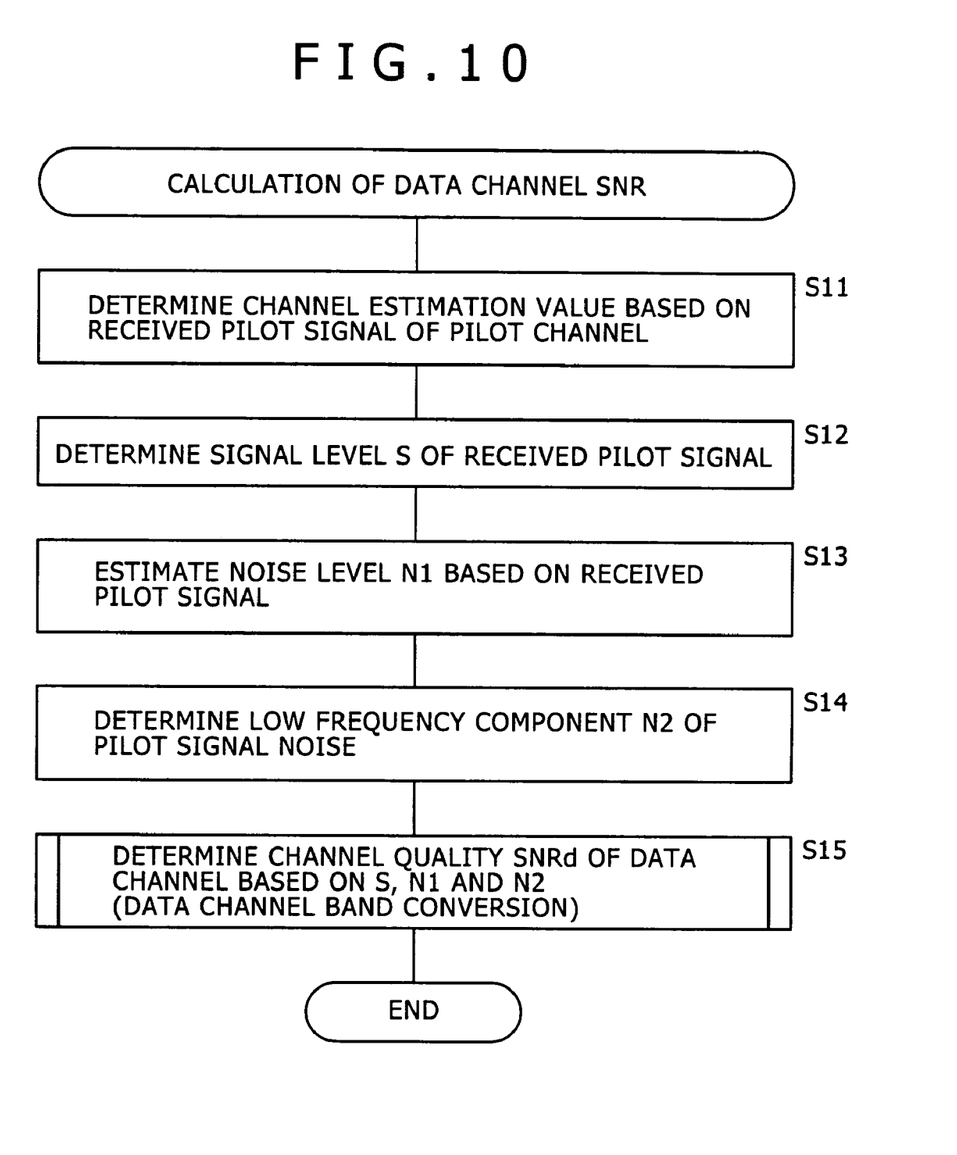
FIG. 10 is a flow chart illustrating a procedure of calculation of the data channel SNR by the embodiment of the present invention.

FIG. 10 illustrates a procedure of calculation of a data channel SNR according to the present embodiment.

Referring to FIGS. 1 and 10, a transmission signal signaled from the base station is received through the transmission/reception apparatus 101 and separated into data of a data channel and pilot channel data by a despreading process by the despreading section 102. The separated pilot signal is inputted to the channel estimation section 103, by which multi-path fading environments are estimated in accordance with the expression (1) given hereinabove (calculation of a channel estimation value) (step S11).

The pilot channel quality estimation section 106 determines a signal component s in accordance with an expression (10) given below and determines a signal level S of the pilot channel in accordance with an expression (11) given below (step S12). Further, the pilot channel quality estimation section 106 calculates noise N1 of the pilot channel in accordance with an expression (12) given below (step S13) and outputs the calculated signal level S and noise N1 to the data channel quality conversion section 107 at the next stage.

$$s = \frac{1}{M} \sum_i (\bar{h}^* \times r_p[i]) \quad (10)$$

$$S = |s|^2 \quad (11)$$

$$N1 = \frac{1}{M-1} \sum_i |r_p[i] - s|^2 \quad (12)$$

The low frequency noise component estimation section 108 estimates a low frequency noise component N2 of the pilot signal noise in accordance with expressions (13), (14) and (15) given below (step S14). The process of the expression (15) corresponds to doubling the spreading factor of the pilot channel and thereby decreases the bandwidth equivalently to one half to determine a low frequency noise component. A despreading process is equivalent to a filter process, and to increase the spreading factor corresponds to narrowing of the bandwidth.

$$s = \frac{1}{M} \sum_i (\bar{h}^* \times r_p[i]) \quad (13)$$

$$S = |s|^2 \quad (14)$$

$$N2 = \frac{1}{\frac{M}{2}-1} \sum_i \left| \frac{r_p[2i] + r_p[2i+1]}{2} - s \right|^2 \quad (15)$$

While an example wherein the spreading factor of the pilot channel is doubled to filter noise is described, it is otherwise possible to pass noise component (rp[i]−s) directly through a low-pass filter or perform frequency separation by an FFT to determine the low frequency noise component N2. The signal component s of the expression (13) is same as that of the expression (10). The signal level S of the expression (11) and the signal level S of the expression (14) are same as each other, and may be calculated by one of the pilot channel quality estimation section 106 and the low frequency noise component estimation section 108 and sent to the data channel quality conversion section 107.

The data channel quality conversion section 107 performs, as a data channel band conversion process, calculation of the data channel SNR (SNRd) in the following manner using the signal level S, noise N1 and low frequency noise component N2 obtained in such a manner as described above (step S15).

Figure 11:
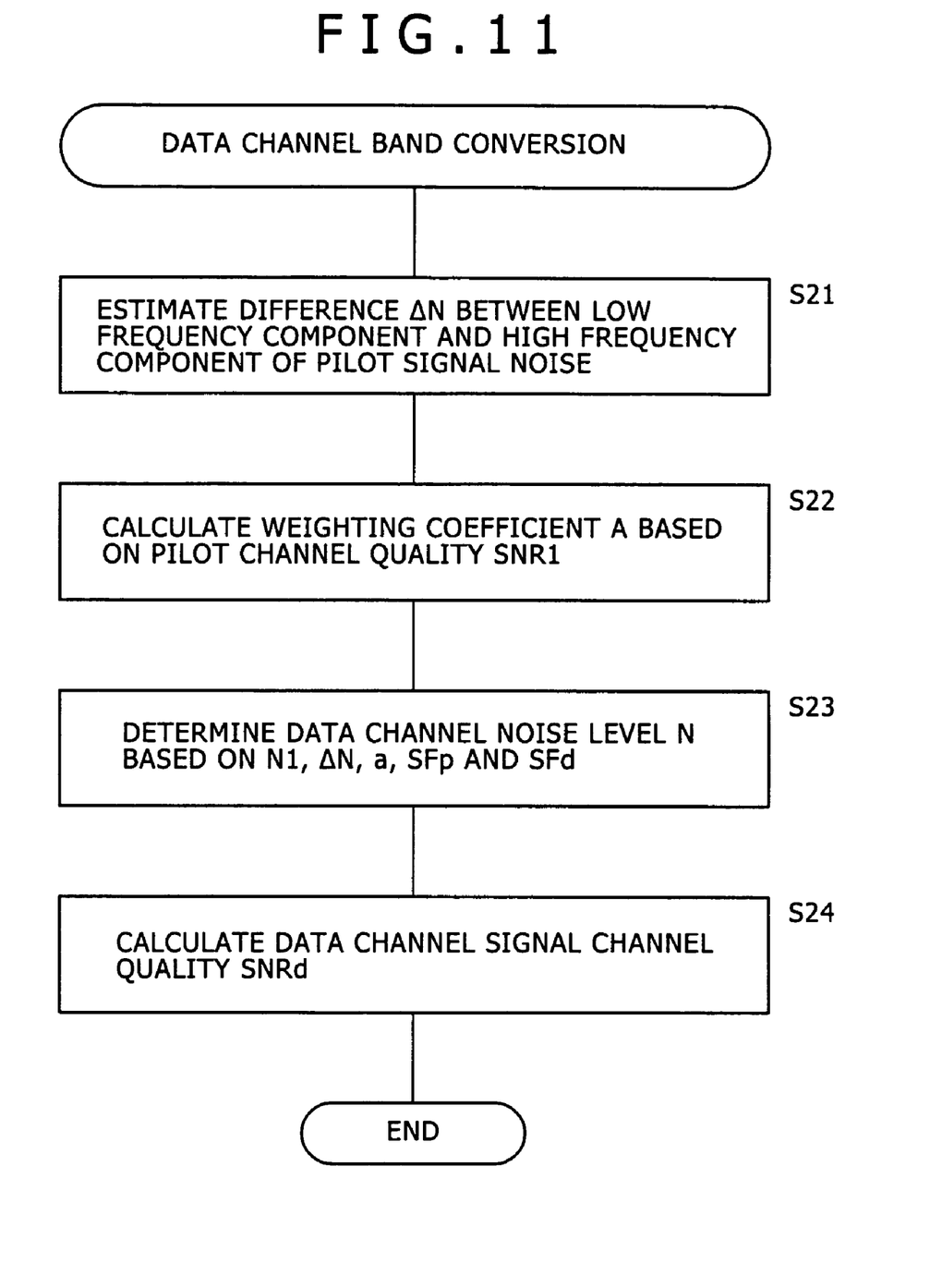
FIG. 11 is a flow chart illustrating a particular example of a data channel band conversion process in the procedure illustrated in FIG. 10.

A particular example of the data channel band conversion process at step S15 is described with reference to FIG. 11.

(a) Estimation of the Difference Between the Low Frequency Component and the High Frequency Component First, the difference ΔN between noise components of the different frequency regions is estimated in accordance with the following expression (16):

$$\Delta N = (2 \times N2 - N1) \quad (16)$$

The coefficient "2" of the first term of the right side in the expression (16) is for compensating for the noise level reduced to one half corresponding to the reduction of the bandwidth to one half described above. If the noise is white, then the difference ΔN value is 0.

Figure 2:
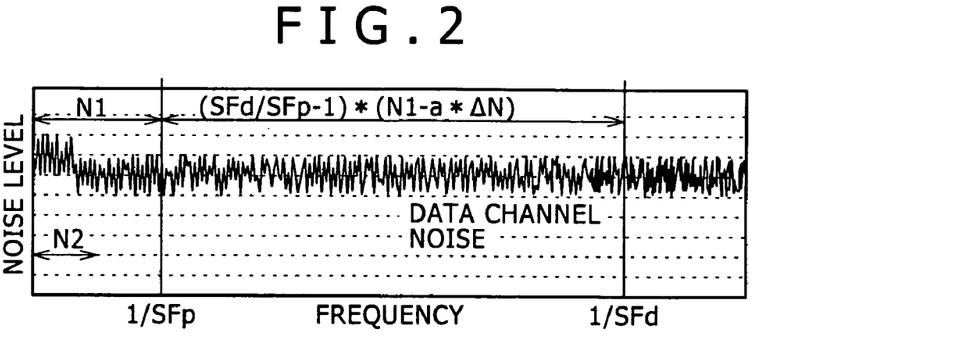
FIG. 2 is a diagram illustrating a manner of conversion of noise of a pilot channel into a noise component in a data channel band in the present embodiment.

It is to be noted here that the "low frequency component" here corresponds to a region on the lower frequency side within the low frequency region of the pilot channel noise as can be seen from FIG. 2, and the noise N1 as the "high frequency component" in a strict sense includes the low frequency noise component N2 and signifies that it is a relatively high frequency component to the "low frequency component".

(b) Weighting Coefficient Calculation

Then, a pilot channel quality SNR1 which depends upon the noise N1 is determined in accordance with an expression (17) given below, and a weighting coefficient a is calculated in accordance with another expression (18) given below based on the calculated pilot channel quality SNR1 (step S22). The weighting coefficient a is used to take it into consideration of the data channel SNR that the influence of white noise appears when the pilot channel quality SNR1 is high.

$$SNR1 = S/N1 \quad (17)$$

$$a = \text{func}(SNR1) \quad (18)$$

where func( ) is a function which is 0.0 when the pilot channel quality SNR1 is low and approaches 1.0 as the pilot channel quality SNR1 increases. For example, the function may be such a simple one that, where two threshold values TH1 and TH2 have a relationship of TH1<TH2, if SNR1<TH1, then a=0.0, but if TH1<=SNR1<TH2, then a=0.5, and if TH2<=SNR1, then a=0.75.

(c) Band Conversion

The high frequency component of the noise N1 determined in accordance with the expression (12) is corrected in response to the difference ΔN, weighting coefficient a and spreading coefficients SFp and SFd as represented by the following expression (19) to perform conversion of the noise N1 into a noise component N of the data channel band (step S23) (refer to FIG. 2):

$$N = N1 + \left(\frac{SF_p}{SF_d} - 1\right) \times (N1 - a\Delta N) \quad (19)$$

It is to be noted that, if the noise is white (ΔN=0), then the noise component N is determined in accordance with the following expression (20):

$$N = \frac{SF_p}{SF_d} N1 \quad (20)$$

The expression (20) is equivalent to the expression (7) described hereinabove in connection with the prior art (however, while the expression (7) adopts a dB representation, the expression (20) adopts a non-dB representation).

The data channel quality SNRd is determined by substituting the noise N determined in accordance with the expression (20) in this manner into the following expression (21) (at step S24):

$$SNR_d = 10\log\frac{S}{N} \text{ [dB]} \quad (21)$$

Figure 3:
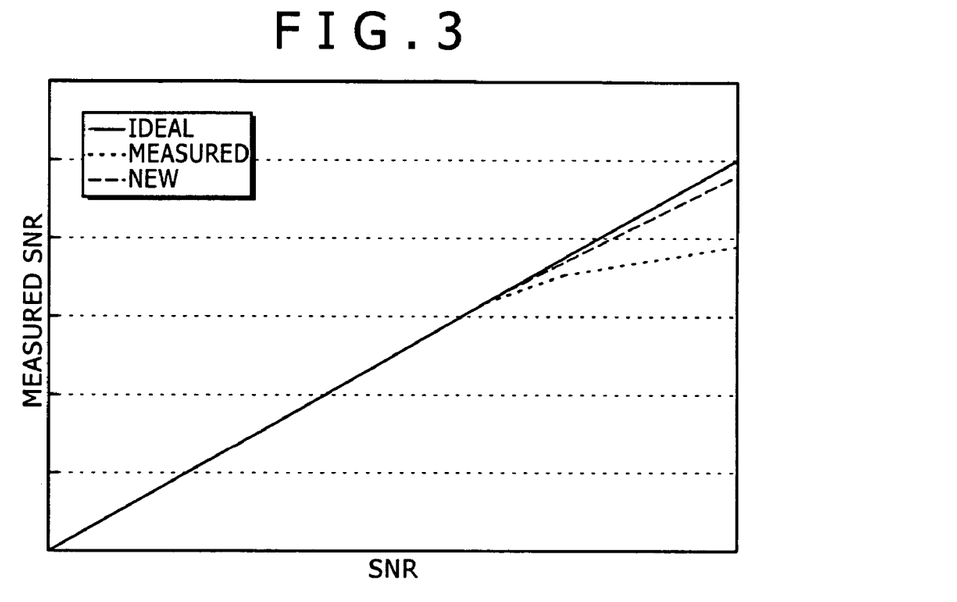
FIG. 3 is a graph illustrating an effect achieved by the embodiment.

According to the present embodiment, by performing correction of internal noise of a receiver which cannot be assumed to be white in this manner, accurate estimation of the channel quality can be anticipated also under a high SNR environment as seen from FIG. 3. Consequently, efficient use of an adaptive modulation and coding method can be anticipated.

While a preferred embodiment of the present invention has been described, various modifications and alterations can be made without departing from the spirit and scope of the present invention. For example, while it is described that the channel quality of a data channel is utilized in a case wherein high-speed data transmission is implemented using an adaptive modulation and coding method is used, it may be utilized also for a different application.

What is claimed is:

1. A channel quality estimation method for estimating, in a communication method wherein a pilot channel for transmitting a pilot signal whose channel quality is to be referred to and an estimation object channel whose channel quality is to be estimated have different bandwidths, the channel quality of the estimation object channel based on the pilot signal, comprising:
extracting a noise component of the pilot signal;
extracting first and second values corresponding to different frequency components which form noise;
expanding the band of the noise component of the pilot signal in response to a degree of difference between the bandwidths of the pilot channel and the estimation object channel;
adjusting the noise amount obtained by the band expansion based on a difference between the first and second values corresponding to different frequency components; and
determining the channel quality of the estimation object channel based on the noise amount obtained by the band expansion and the adjusting.

2. The channel quality estimation method according to claim 1, wherein the step of extracting first and second values corresponding to different frequency components which form the noise includes:
determining a low frequency component as the first value corresponding to the different frequency components which form the noise;
estimating a difference in noise component which depends on a frequency region from the determined low frequency component and the extracted noise component;
adjusting the noise amount whose band is to be expanded based on the difference in noise component.

3. The reception quality estimation method according to claim 2, further comprising:
determining a channel quality of the pilot channel; and
weighting the difference in noise component in response to the determined channel quality of the pilot channel.

4. A channel quality estimation method for estimating, in a communication method wherein a pilot channel for transmitting a pilot signal whose channel quality is to be referred to and an estimation object channel whose channel quality is to be estimated have different bandwidths, the channel quality of the estimation object channel based on the pilot signal, comprising:
extracting a noise component of the pilot signal;
extracting colored noise;
expanding the band of the noise component of the pilot signal in response to a degree of difference between the bandwidths of the pilot channel and the estimation object channel;
adjusting, when the band is expanded, the noise component based on the colored noise; and
determining the channel quality of the estimation object channel based on the noise amount obtained by the band expansion based on the adjusted noise component.

5. The channel quality estimation method according to claim 4, wherein the adjustment of the noise component is executed only when the channel quality of the pilot channel is higher than a predetermined level.

6. An apparatus for estimating a channel quality of an estimation object channel based on a pilot signal in a communication system wherein a pilot channel for transmitting the pilot signal whose channel quality is to be referred to and the estimation object channel whose channel quality is to be estimated have different bandwidths, comprising:
a pilot channel quality estimation unit configured to extract a first value corresponding to a noise component of the pilot signal;
a low frequency noise component estimation unit configured to extract a second value corresponding to a low frequency noise component of the pilot signal; and
a data channel quality conversion section configured to expand the band of the noise component of the pilot signal in response to a degree of difference between the bandwidths of the pilot channel and the estimation object channel, adjust the noise amount obtained by the band expansion based on a difference between the first and second values, and determined the channel quality based of the estimation object channel based on the noise amount obtained by the band expansion based and the adjusting.

7. An apparatus for estimating a channel quality of an estimation object channel based on a pilot signal in a communication system wherein a pilot channel for transmitting the pilot signal whose channel quality is to be referred to and the estimation object channel whose channel quality is to be estimated have different bandwidths, comprising;

a pilot channel quality estimation unit configured to extract a noise component of the pilot signal; and a data channel quality conversion section configured to exact colored noise from the noise component of the pilot signal, expand the band of the noise component of the pilot signal in response to a degree of difference between the bandwidths of the pilot channel and the estimation object channel, adjust the noise component based on the colored noise, and determine the channel quality of the estimation object channel based on the noise amount obtained by the expansion based on the adjusted noise component.

* * * * *

UNITED STATES PATENT AND TRADEMARK OFFICE
CERTIFICATE OF CORRECTION

PATENT NO. : 7,474,628 B2
APPLICATION NO. : 11/092901
DATED : January 6, 2009
INVENTOR(S) : Katsutoshi Itoh It is certified that error appears in the above-identified patent and that said Letters Patent is hereby corrected as shown below:

On the title page,

[*] Notice: Subject to any disclaimer, the term of this patent is extended or adjusted under 35 USC 154(b) by (615) days Delete the phrase "by 615 days" and insert -- by 892 days --

Signed and Sealed this

Twentieth Day of April, 2010

David J. Kappos
*Director of the United States Patent and Trademark Office*